Sept. 10, 1968    A. SYDORIAK    3,400,685
PORTABLE BOAT
Filed March 7, 1967    7 Sheets-Sheet 1
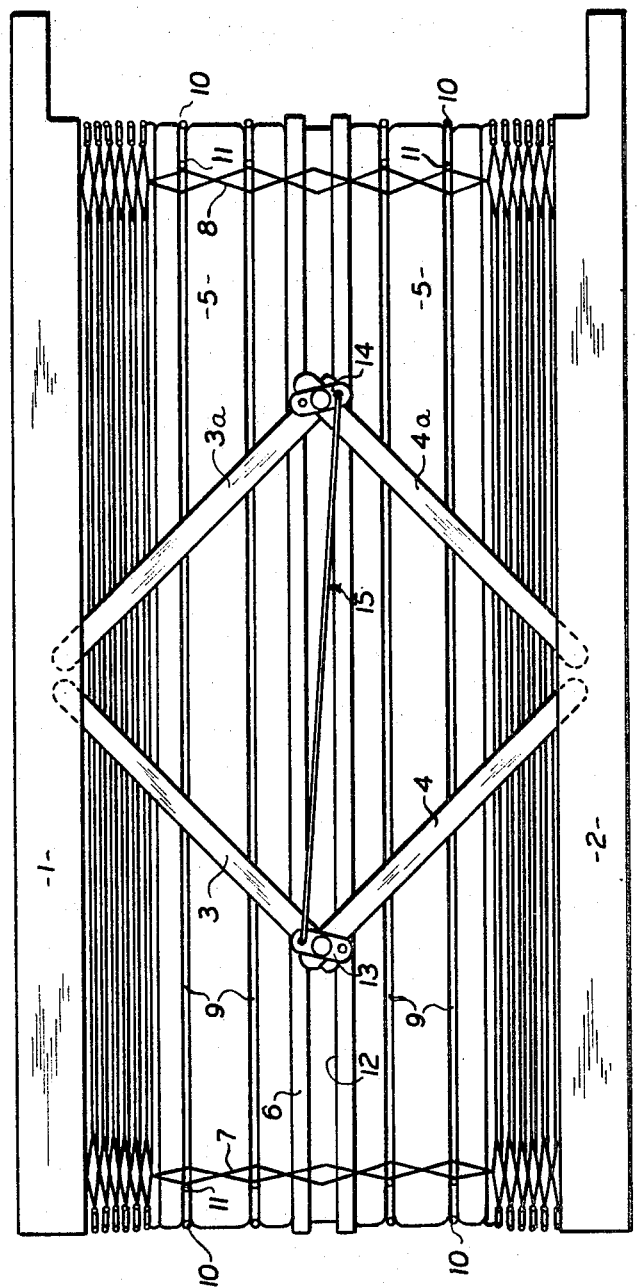
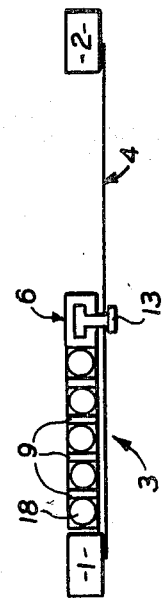
INVENTOR
ALEXANDER SYDORIAK
BY James Fr. Heilman
ATTORNEY.

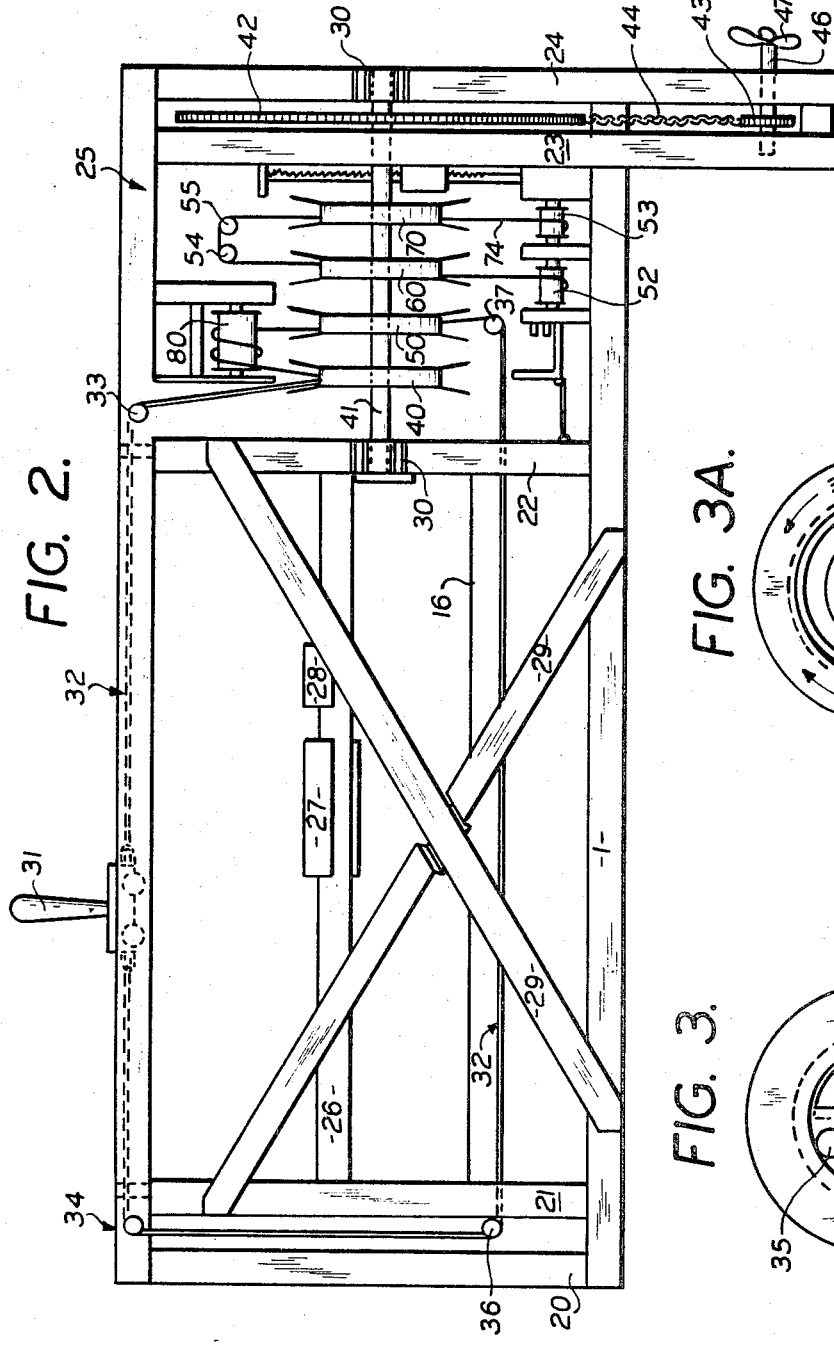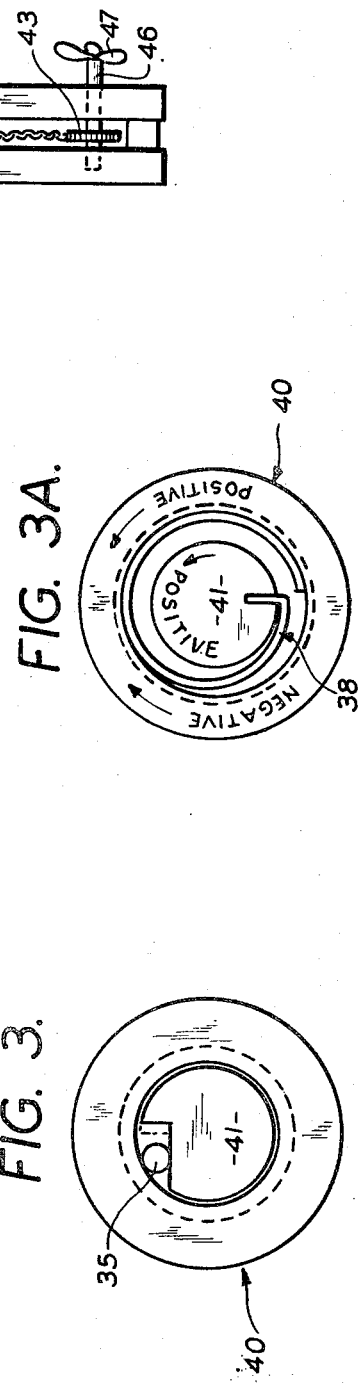

Sept. 10, 1968     A. SYDORIAK     3,400,685
PORTABLE BOAT

Filed March 7, 1967     7 Sheets-Sheet 3

INVENTOR
ALEXANDER SYDORIAK
BY *James M. Heilman*
ATTORNEY.

Sept. 10, 1968     A. SYDORIAK     3,400,685
PORTABLE BOAT
Filed March 7, 1967     7 Sheets-Sheet 4

INVENTOR
ALEXANDER SYDORIAK
BY
*James M. Heilman*
ATTORNEY.

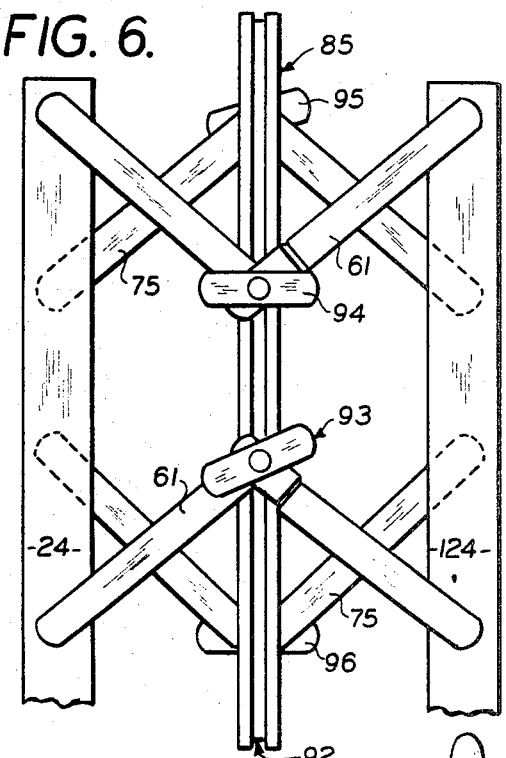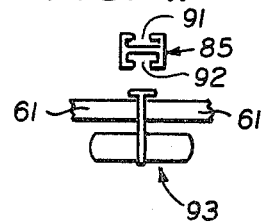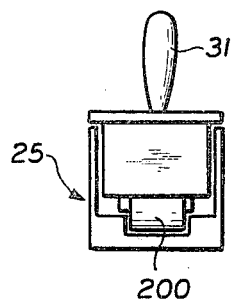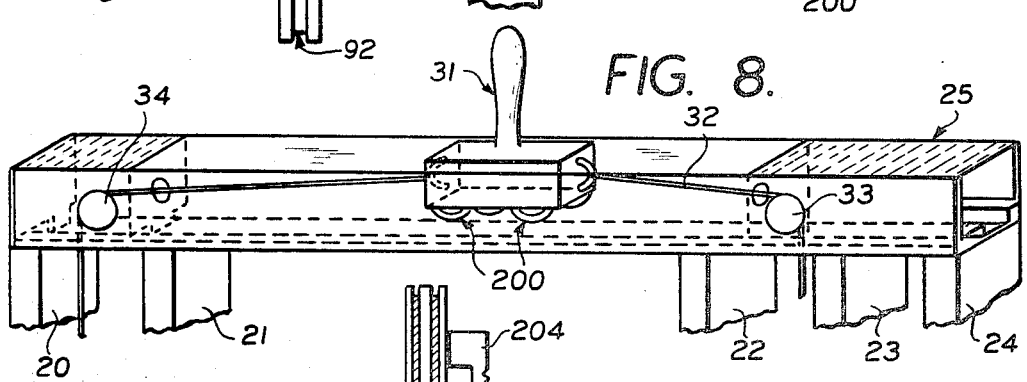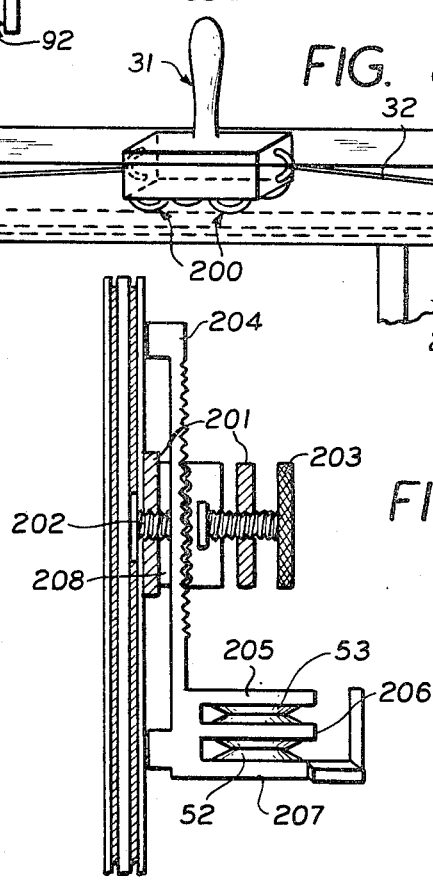

Sept. 10, 1968  A. SYDORIAK  3,400,685
PORTABLE BOAT
Filed March 7, 1967  7 Sheets-Sheet 6
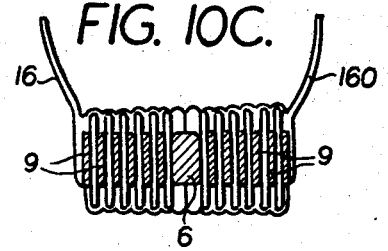
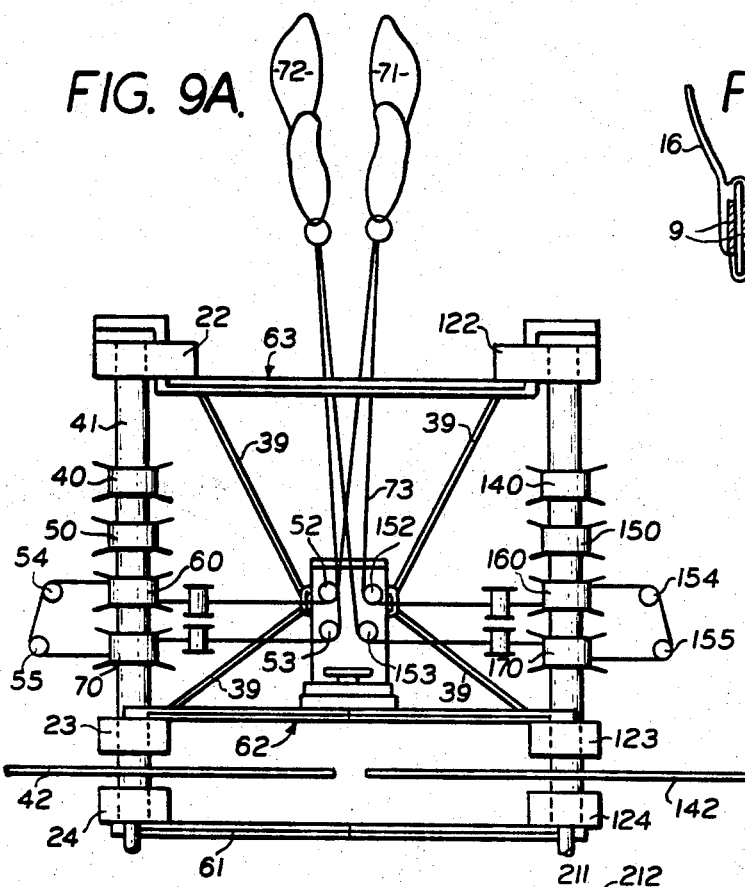
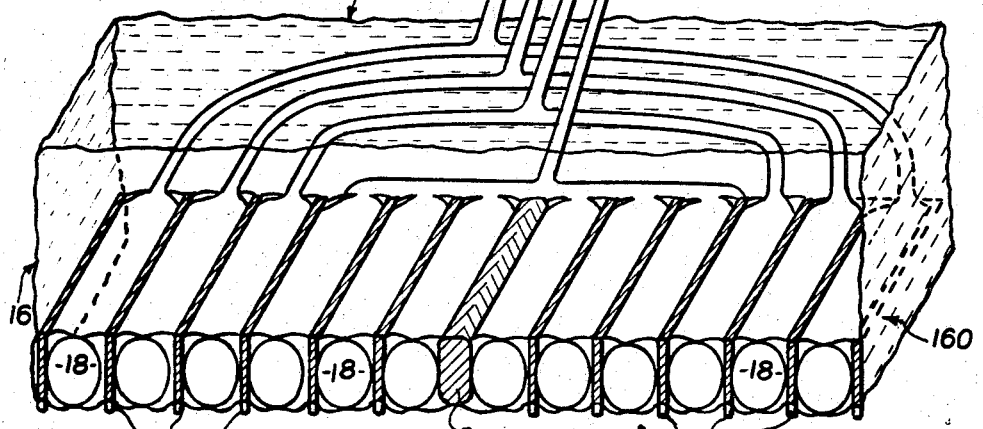
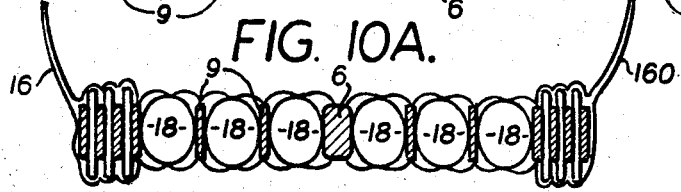
INVENTOR
ALEXANDER SYDORIAK
BY
*James M. Heilman*
ATTORNEY.

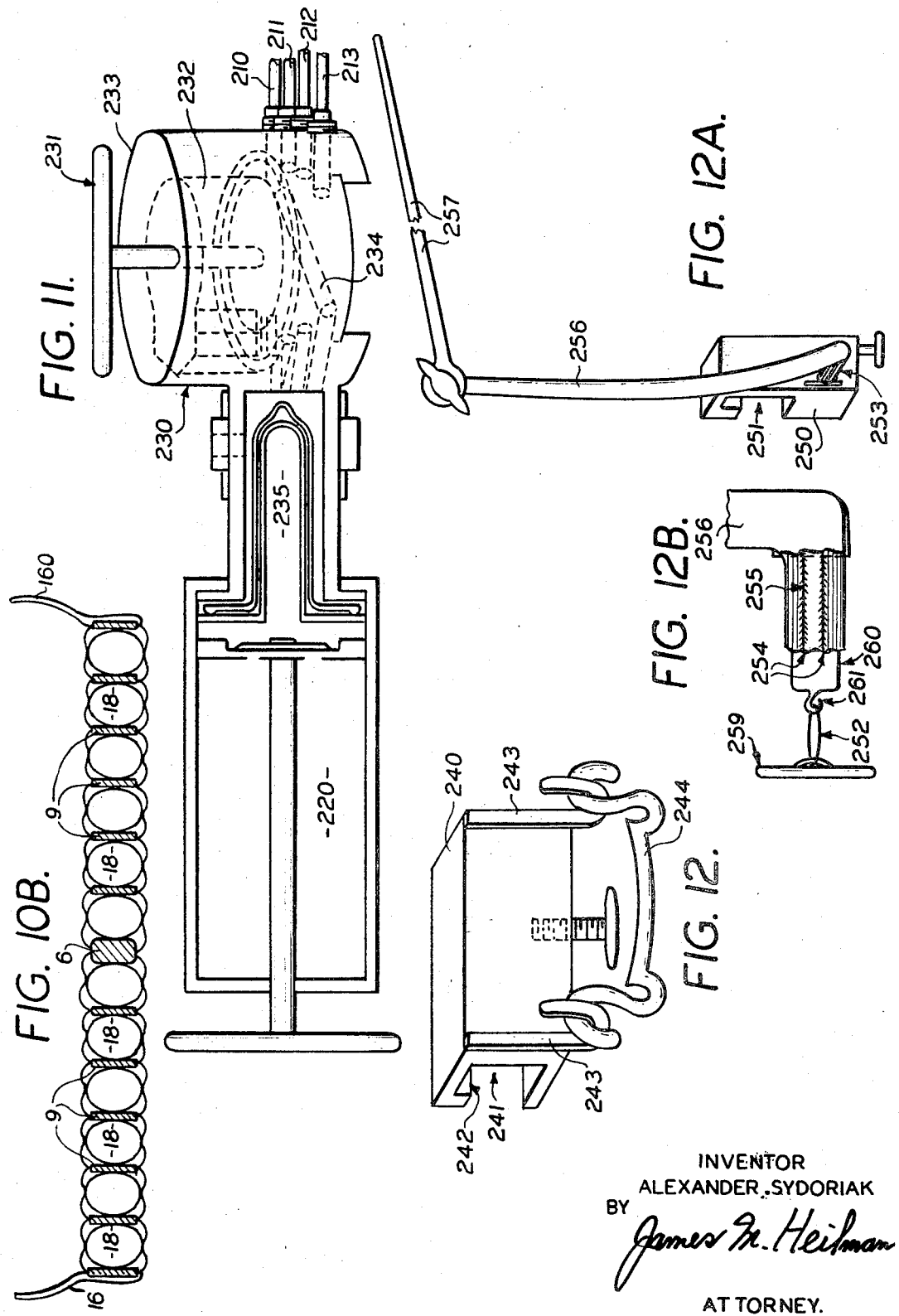

United States Patent Office 3,400,685
Patented Sept. 10, 1968

3,400,685
PORTABLE BOAT
Alexander Sydoriak, Kingston, N.Y.
(P.O. Box 183, Berea, Ohio 44017)
Filed Mar. 7, 1967, Ser. No. 621,188
12 Claims. (Cl. 115—24)

ABSTRACT OF THE DISCLOSURE

A collapsible, movable boat assembly wherein fabric sections can be inflated or deflated. The craft is supported longitudinally and cross-sectionally by rigid elements which can be folded or expanded as desired. The craft is driven by either foot or hand action which motivates propellers positioned on each side of the craft at the stern thereof.

Background of the invention

The inventor has been interested in the development of a craft of this sort for the purpose of physical fitness and commercial reasons.

The present invention is broadly concerned with a unique expandable-collapsible boat assembly and with a novel mechanism for its propulsion. The boat assembly of the present invention is collapsible and readily and easily transported from one location to another. In addition, the preset boat assembly is particularly desirable in that it is maneuverable manually, utilizing either arms or legs, or both arms and legs, in conjunction with an interrelated and coordinated power transmission system. The boat is particularly desirable for multipurposes which include, among others, operations for pleasure, profit, and operations for exercise and build-up of the entire physique.

In essence, the boat assembly, of bellows construction, may be readily compacted for transportation from one location to another location and thereafter readily and quickly expanded for immediate utilization. The manual power is transmitted from the operator of the boat through an interrelated mechanism system wherein either hands or legs may operate two balanced propellers or wherein one hand may operate one of the balanced propellers, and the other hand operate the other of the propellers. Also, both hands and both legs may be used simultaneously for the propulsion power source.

Many suggestions have been made in the prior art for the construction and operation of portable boats, canoes, crafts, and the like. Also, many mechanisms have been suggested for securing the desired impelling power and maneuverability of the craft. However, none of these crafts of the prior art indicate or in any manner whatsoever teach and secure the many desirable features inherently built into the craft of the present invention.

The present invention may be readily understood by reference to the drawings illustrating embodiments of the same. FIGURE 1 is a diagrammatic bottom view, looking up, of the craft illustrating some of the structural features which permit the craft to be readily expanded and compacted as desired, while FIGURE 1A shows some details as to the construction of the inflatable bottom. FIGURE 2 is a side view of the craft illustrating further structural elements and also, in some detail, the mechanism for propelling the craft.

Figure 2A:
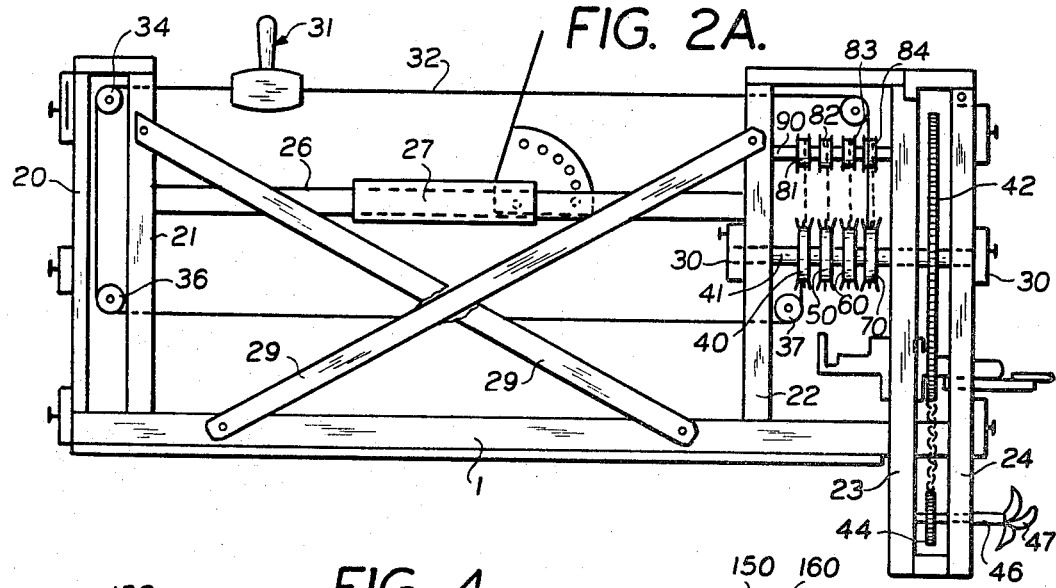
Figure 4:
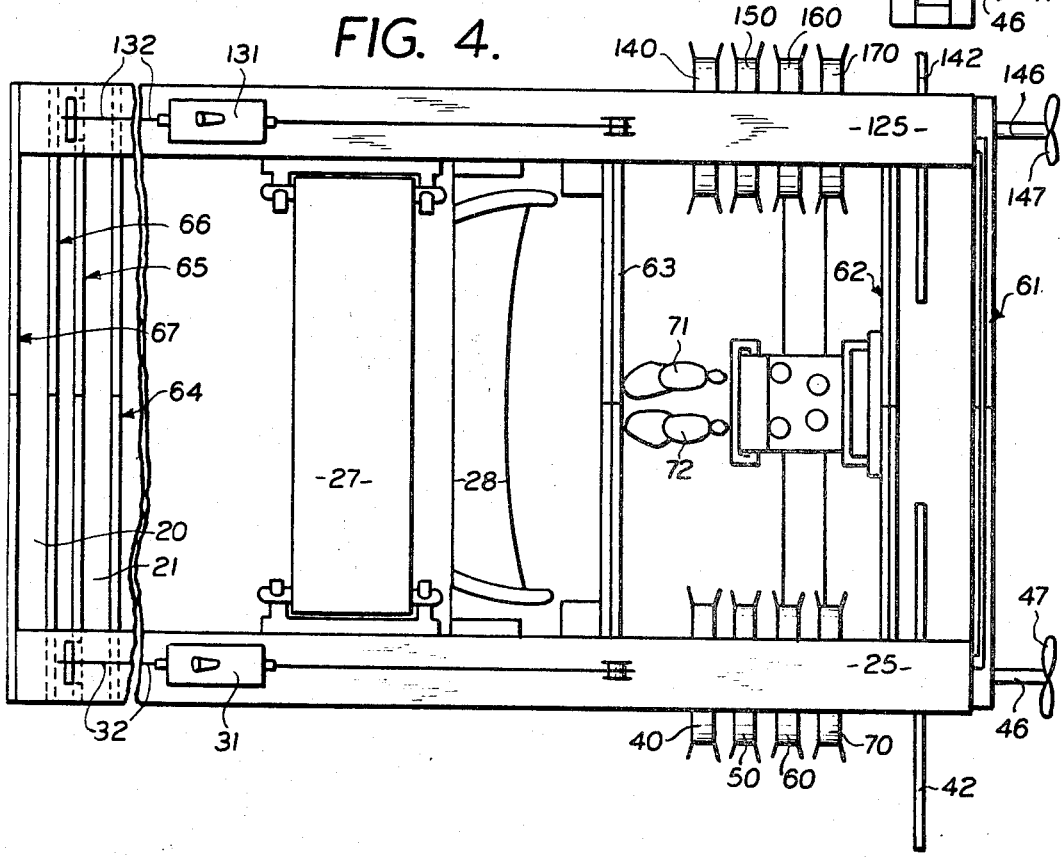
Figure 4A:
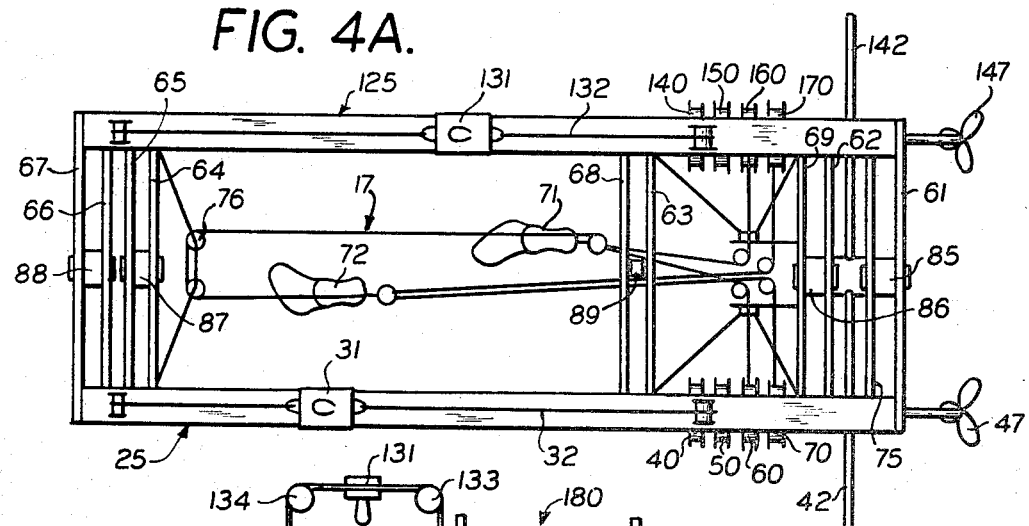
Figure 5:
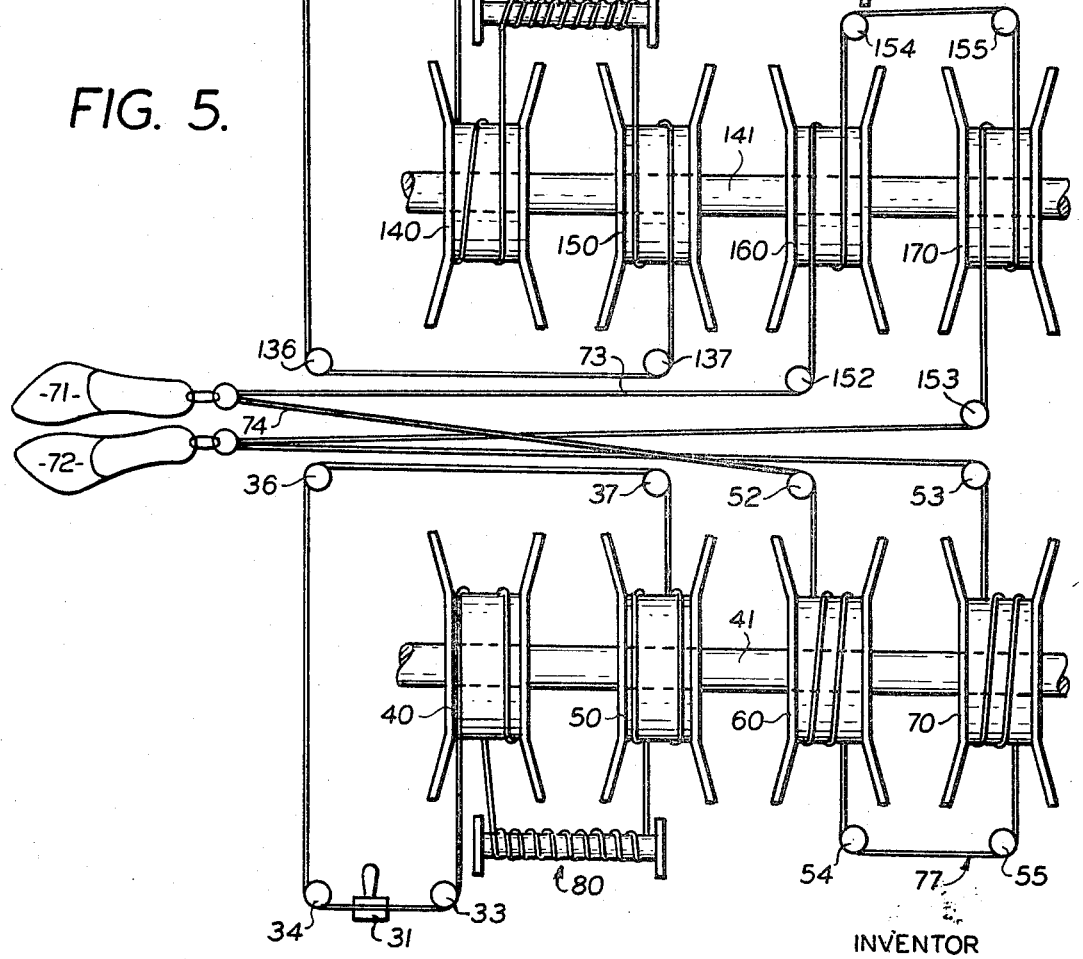

FIGURE 2A is a side view of the craft showing in some detail an alternate method for driving the propellers. FIGURES 3 and 3A illustrate typical clutch mechanisms. FIGURE 4 is a top view of the craft showing in some detail the hand-and-pedal method of operating the respective rollers. FIGURE 4A is a top view of the craft illustrating further details as to methods for propulsion. FIGURE 5 is a diagrammatical view showing the method of tying in the hand assemblies and the pedal assemblies with the respective rollers. FIGURE 6 shows the means by which the craft is expanded to the desired width. FIGURE 7 illustrates in detail a cross section of one central element. FIGURES 8 and 8A illustrate details of the hand assemblies. FIGURE 9 illustrates a method of affixing the roller assembly to the craft. FIGURE 9A is a top view illustrating further details of the propulsion means. FIGURES 10, 10A, 10B and 10C illustrate details of the inflatable membranes and FIGURE 11 illustrates a method of inflating the respective compartments. FIGURES 12 and 12A illustrate a desirable seat assembly.

Referring specifically to FIGURE 1, the boat is supported lengthwise by two parallel longitudinal bottom side bars 1 and 2 and a central bar 6 which extend the length of the craft. Side bars 1 and 2 and central bar 6 are interconnected by means of folding or collapsible crossbars 3, 3a and 4 and 4a which also function to support inflatable membrane bottom elements 5, which are positioned between the respective side bars 1 and 2. As illustrated in FIGURE 1, only the center sections of elements 5 are inflated while the side elements of 5 are deflated. Additional support and structural strength is imparted to the craft by the use of folding crossbars 7 and 8 which are affixed to bars 1 and 2 near the ends thereof. Stability is further imparted to the craft by the use of central bar 6 which preferably seats securely in elements 5 as hereinafter described. Between the individual tubes of the inflatable membrane assembly 5 there are supporting plates 9, which preferably extend longitudinally in separate membranous compartments as will hereinafter be described.

Longitudinal central bar 6 is a recessed, slotted element containing a recess 12 adapted to receive thumb screw assemblies 13 and 14. These thumb screw assemblies rigidly affix the crossbars to central bar 6 and prevent movement thereof when the screws are tightened Accidental and premature unwinding of these thumb screws during the operation of the craft is prevented by means of a tieline element 15. If it is desired to widen the craft, thumb screw elements 13 and 14 are unloosened and moved one toward the other thereby moving elements 1 and 2 away from each other, and thereby widening the craft. Thus, the width of the craft is determined by the relative positions of the thumb screw assemblies 13 and 14 in the recesses 12 of central bar 6.

On each end of each plate 9 and central rod 6 there are hooks 10, which are affixed to individual hooks 11 on each folding crossbars 7 and 8 by means of resilient, but tough, strings. The individual plates 9 and central rod 6 affix firmly the inflatable membrane assembly 5 to the bottom of the boat. Also, much greater stability of the bottom of the craft is secured by these strings. One satisfactory structure of inflatable assembly 5 is illustrated in FIGURE 1A which is a cross-sectional end view of the same. Center slotted support rod 6 and support plate elements 9 are shown in their separate membranous compartments between the inflatable compartment 18 of assembly 5.

Referring specifically to FIGURE 2, one bottom side bar 1 is illustrated together with firmly affixed thereto vertical supporting bars 20, 21, 22, 23 and 24. While only the left-hand side of the craft is shown with the stern toward the right, and bow to the left, it is to be understood that the right-hand side of the craft is of a similar construction. These bars are also firmly affixed at the top to a longitudinal tract bar 25. Additional support is secured by intermediate bar 26 which also supports the seat holder 27 and back support 28. Two lateral crossbars 29 tie vertical bars 21 and 22 together and also tie these bars to the bottom bar 1. Water is prevented from flowing into the craft by a vertical membrane 16 which extends completely around the craft, around vertical bars 20 and 23, about the respective ends of the craft and along the opposite side. The height to which membrane 16 extends upwardly is below the lower ends of elements 40, 50, 60 and 70 hereinafter described. The height must obviously be enough to secure sufficient water displacement to prevent the craft from sinking when in use, with the desired safety factor for wave action. This membrane 16 may be secured by conventional means to the vertical supporting bars. The area between vertical bars 22 and 23 might be closed by a rigid plate instead of membrane 16 which will function to firm the entire side of the boat.

An axle 41 passes through bar 23 and is supported between upright bars 22 and 24 in suitable bearings 30 in the upright bars 22 and 24. This axle 41 supports roller wheels or clutch rollers 40, 50, 60 and 70 between upright bars 22 and 23. These rollers 40, 50, 60 and 70 contain clutches which, while rotating in one direction, are engaged upon axle 41 and thus rotate the axle in the same direction either clockwise or counterclockwise as designed. This rotation rotates large gear wheel 42 which is affixed upon axle 41 and transmits the motion to the propeller to move the boat. When clutch rollers rotate in the opposite direction, then axle 41 disengages from the rollers and the axle continues rotation in the same direction as previously. For this purpose the clutch rollers 40, 50, 60 and 70 are integrated into two set groups. One set of rollers engages upon axle 41 while the other set disengages. Then, in turn, the other set engages while the first one disengages from axle 41. This arrangement permits continuous, uninterrupted rotation of the propelling wheels thereby moving the boat in a forward direction.

Rotation of large gear wheel 42 by means of rollers 40, 50, 60 and 70, as hereafter described, will rotate small drive wheel 43 by means of roller chain 44. Small drive wheel 43 is mounted on propeller axle 46 which is supported between bars 23 and 24. A propeller 47 is mounted at the end axle 46 and thus, when rotated, impels the craft forward.

A handle assembly 31 for motivation of the craft supported as hereinafter described, has a string 32 or equivalent means, attached to each end thereof. One end of string 32 moves about a stern top pulley 33 and is adapted to be wound and unwound on roller 40. The other end of string 32 passes around top bow pulley 34, around a lower bow pulley 36 and around a stern lower roller or pulley 37 and is adapted to be wound and unwound on roller 50.

Thus, in operation when handle 31 is pulled toward the stern or operator tension is placed on the string ahead of the handle causing the same to be unwound from roller 50. For purposes of illustration, it is assumed that roller 50 is rotating in a clockwise direction (looking toward the bow) and is engaged with axle 41 causing the same to rotate in a clockwise direction. This causes large gear wheel 42 to rotate in a clockwise direction which energy is transmitted as hereinbefore described to propeller 47 thereby impelling the craft forward. Simultaneously, tension on the string behind handle assembly 31 is lessened and this string is caused to pass about upper stern roller 33 and is wound about roller 40. Construction is designed in a conventional manner so that when the string is being wound about roller 40 this roller will rotate in a counterclockwise direction and will be disengaged from axle 41.

On the other hand, when handle assembly is moved in a forward direction toward the bow, tension will be placed on the string 32 behind handle assembly 31 and the string will be unwound from roller 40 in a manner to cause the same to rotate in a clockwise direction while clutch engaged with axle 41. This will cause axle 41 to rotate in a clockwise direction in a manner as described. Simultaneously, roller 50 will rotate in a counterclockwise direction and will be disengaged by suitable clutch means from axle 41.

As illustrated, a spool or roller element 80 is positioned intermediate rollers 40 and 50 with respect to the string action. When the string is moving from roller 40, or in the direction from roller 40 to roller 50, it moves about spool 80 onto roller 50. When the string is moving in the direction from roller 50 to roller 40 the string moves about roller or spool 80 onto roller 40. Thus, when one of the spools 40 or 50 is clutch engaged with the axle 41 and imparting energy thereto, the other complementary spool such as roller 50 is rotating in a counterclockwise direction and is disengaged from axle 41. Thus, by imparting an oscillating motion to handle assembly 31 alternately one roller is clutch engaged with the axle 41 while the other roller is clutch disengaged from axle 41. At all times axle 41 will be rotated in a clockwise power imparting direction. It is to be understood that the power cycle can be designed so that the power is imparted to axle 41 when the respective rollers are rotating in a counterclockwise direction and that the respective rollers are clutch disengaged when rotating in a clockwise direction.

Handle assembly activating means 31 has been described with respect to the left hand, on the port side of the craft, actuating the port propeller. The right hand will operate a similar and equivalent mechanism on the starboard side of the craft, so as to drive a starboard propeller in a like manner. Either hand drive mechanism may be operated independently or simultaneously, or at different rates by the respective right and left hands of the operator.

Clutch rollers 60 and 70 operate in a manner as described with regard to rollers 40 and 50 except that they are foot impelled. When roller 60 is rotating clockwise, it is clutch engaged with axle 41 while roller 70 is rotating counterclockwise and is disengaged from the axle 41. Tension is applied to string 74 by a foot, causing it to move around roller 52 and rotate clutch roller 60 clockwise and rotate axle 41. This string moves around rollers or equivalent means 54 and 55 and onto roller 70 which rotates counterclockwise while being disengaged from axle 41. On the power cycle for roller 70 the reverse occurs, and string 74 moves about roller 53 from clutch roller 70, causing 70 to rotate clockwise. The string 74 passes about rollers 55 and 54 and unwinds from roller 60.

Another mechanism for imparting continuous power to axle 41 by oscillating motion of hand and feet is illustrated in FIGURE 2A. Elements similar to those described in FIGURE 2 are similarly numbered. A shaft 90 is positioned above axle 41 and supports four spring loaded spools 81, 82, 83 and 84. Shaft or axle 41 between bars 22 and 24 also supports a large drive gear wheel 42. This wheel 42, as described with respect to FIGURE 2, is driven by clutch wheels 40, 50, 60 and 70.

All the rollers as described with respect to FIGURE 2, 40, 50, 60 and 70 are of a suitable clutch construction in that, when they are rotated in a clockwise or positive direction, they will drive shaft 41 in a clockwise or positive direction. On the other hand, when the rollers are rotated in a negative direction or counterclockwise these rollers will become disengaged from shaft 41 and thus will not impart energy to shaft 41 and large drive wheel 42.

Rollers 81, 82, 83 and 84 are spring loaded spools which function to wind the strings on rollers 40, 50, 60 and 70 when tension is released on that particular end of the string. Rollers 40 and 70 are complementary and function as follows: When handle assembly 31 is hand pulled or actuated toward the stern of the boat, tension will be placed on string 32 ahead of handle assembly 31 and string 32 will unwind from roller 40 and, at the same time, increasing tension will be placed on the spring spool 81 which has one end attached to spool 40. Simultaneously, tension on string 32 to the rear of handle assembly 31 is reduced. This string is rewound on roller 70 by the action of spring tension element 84. Since roller 40 is rotating in a clockwise direction it is engaged by means of the clutch element with axle 41, thereby imparting energy to the axle.

After the handle assembly 31 has reached a position near the individual positioned on seat 27, the handle 31 is thrust manually forward thereby putting tension on string 32 to the rear of the handle assembly 31. The string moves about the upper stern pulley and causes the string to be unwound from roller 70 thereby rotating 70 in a positive or clockwise direction. The clutch engages 70 with axle 41, which rotates large wheel 42, chain 44, small wheel 43 and impeller 47. At the same time tension is released on the string forward of handle assembly 31 and roller 40. The string is rewound on roller 40 by the spool spring 81 which spring was placed in tension on the spool spring during the energy imposing cycle or positive cycle. During the string windup cycle of roller 40 it is, as described, disengaged from the axle 41.

Thus, a forward motion on handle assembly 31 will cause the string to be wound up on roller 40 while disengaged from the axle 41 and cause the string on roller 70 to be unwound while engaged on the axle 41 thereby causing large wheel 42, small wheel 43, and the propeller 47 to be continuously rotated in a positive or clockwise direction. A to motion will reverse the cycle. It is to be understood that, while the mechanism has been described with respect to FIGURE 2A wherein energy is imparted to the propeller, when axle 41 is operating clockwise, by known adjustments the energy may be imparted to the propeller when the axle is rotated counterclockwise.

Roller 50 and roller 60 are activated by the feet in a manner hereinafter described. In all cases in a manner as described with respect to rollers 40 and 70, while tension is maintained on the string to unwind the same from the rollers 50 and 60, the rollers are clutch engaged with respect to axle 41 causing the same to rotate clockwise and, at the same time, imparting tension to corresponding spool spring elements 82 and 83.

While any suitable clutch mechanism may be used, preferred types are illustrated in FIGURES 3 and 3A. FIGURE 3, by way of description, is a cross-section through clutch roller 40. Axle 41 is notched for clutching purposes. A clutch rod 35 of proper size is located within the notch. When 40 is rotated clockwise it will engage axle 41 and rotate it clockwise in the power imparting direction. When roller 40 is rotated in a counterclockwise direction, it will unclutch rod 35 and will be clutch disengaged from axle 41. When the mechanism is as shown in FIGURE 2A each roller 40, 50, 60 and 70 has two compartments on its round surface. One compartment is provided for winding the spring from the spools 81, 82, 83 and 84 respectively while the other compartment is for winding the roller string. On the other hand, when the mechanism is as shown in FIGURE 2 each roller has but one compartment.

FIGURE 3A shows the details of another type of clutch wheel 40 which is similar with respect to the other drive wheels. When, for example, wheel 40 rotates in a positive or counterclockwise direction, clutch spring 38 shown in FIGURE 3A will resist sliding due to its construction and will clutch against the annular ring of wheel 40 and thus shaft 41 will also be rotated in a counterclockwise direction. This illustrates a mechanism when the power imparting motion is counterclockwise.

FIGURE 4 is a top view of the craft illustrating the driving mechanism. As pointed out with respect to FIGURE 2, hand assembly 31 will actuate clutch rollers 40 and 50. Hand assembly 131 on the starboard side of the craft will actuate rollers 140 and 150. Hand assemblies 31 and 131 are roller type and seat in appropriate runways. These hand assemblies may be actuated in unison, one at a time, or in an alternate manner. The craft is steered by the manner in which these hand assemblies are actuated. Seat 27 and back support 28 are suitably supported between the sides of the craft. Collapsible crossbar assemblies 61, 62, 63, 64, 65, 66 and 67 connect and support the sides of the craft. These crossbar assemblies are preferably affixed to vertical supporting bars 20, 21, 22, 23 and 24. (See FIGURE 2.)

Clutch rollers 60, 70, 160 and 170 are foot impelled by means of foot pads 71 and 72, in a manner as hereinafter described. When one pad is propelled forward, the other pad is retracted. The motion of these pads is to actuate rollers 60, 70, 160 and 170 in a manner that when clutch rollers 60 and 160 are clutch engaged moving clockwise, rollers 70 and 170 are clutch disengaged. These latter rollers are actuated in a manner as described with respect to rollers 40 and 50. Crossbar assemblies are attached to the upright vertical supporting bars 20–24 described with respect to FIGURE 2. In FIGURE 4 crossbar assemblies 67, 66, 65 and 64 are shown on each side of uprights 20 and 21, while crossbars 63, 62 and 61 are shown on one side of uprights 22, 23 and 24. As shown in FIGURE 4A it is preferred to also have crossbar assemblies 68, 69 and 75 on the other faces of bars 22, 23 and 24. (See FIGURE 2.) Assembly 61 and assembly 75 are on opposite sides of 24, assemblies 62 and 69 are on opposite sides of 23 and assemblies 63 and 68 are on opposite sides of 22.

Pads 71 and 72 are preferably connected by a string 17 (see FIGURE 4A) around suitable pulleys 76 to avoid rapid snapback. Vertical central elements 85, 86, 87, 88 and 89 are also shown, the construction of which and the interrelationship of which with respect to the crossbar assemblies will be hereinafter described.

The method of imparting drive action to axles 41 and 141 is shown diagrammatically in FIGURE 5. Referring to FIGURE 5 which shows pedal mechanisms which differ from the manual in that forward motion only of any pedal will impart driving force upon both right and left axles 41 and 141 to propel the boat forward. The pedal mechanisms are interconnected by means of strings or wires. When one pedal is moved forward the other pedal is pulled backward. Forward motion of any pedal imparts driving force upon both propellers left 47 and right 147. This motion will also retract the other pedal and rewinds other rollers on both the left and right side. Each pedal mechanism consists of two clutch rollers. The clutch rollers rotate in opposite direction upon themselves. The axle, however, rotates only in one propelling clockwise direction thereby moving the boat.

Specifically, the pedal mechanism consists of two pedals 71 and 72 and two clutch rollers on each side, 60 and 70 on the left or port side, and rollers 160 and 170 on the right or starboard side. Both pedals and all four rollers for the feet are dependently interconnected by strings 73 and 77. Thus, pushing forward the right pedal 71 will pull and unwind rollers 60 on the port side and 160 on the starboard side. In this description the rollers moving counterclockwise are clutch engaged with axle 41 and axle 141 and thereby propel the craft. The string 73 passes about roller 152, clutch roller 160, around pulleys 154 and 155 and moves roller 170 clockwise which is disengaged from axle 141. String, or wire, 73 passes from roller 170 about pulley 153 and retracts pad 72.

String 77 from pad 71 passes about pulley 52 and around clutch roller 60 rotating it counterclockwise while clutch engaged with axle 41. String 77 then passes around pulleys 54 and 55 to clutch roller 70, thereby rotating the same clockwise, while disengaged from axle 41. String 77 passes around pulley 53 to pad 72, retracting the same.

When pad 71 is thrust forward and pad 72 retracted, then a forward thrust on pad 72 will cause string 73 to move about pulley 153 and rotate clutch roller 170 counterclockwise while clutch engaged with 141. String 73 will move about pulleys 155 and 154 and rotate roller 160 in a clockwise movement while clutch disengaged. String 73 passes from clutch roller 160 about pulley 152 to pad 71 to retract the same. At the same time string 77 passes from pad 72 about pulley 53 to clutch roller 70 causing the same to rotate counterclockwise while clutch engaged.

String 77 passes from roller 70 about pulley 55 and 54 to clutch roller 60, causing the same to rotate clockwise while clutch disengaged. The string then moves about pulley 52 to pad 71 causing the same to move backwards. Thus, an alternate movement by each pad will impart a continuous drive torque to the respective axles 41 and 141.

FIGURE 6 is a forward looking view from the stern showing in some detail the collapsible traverse structures 61 and 75 (FIGURE 4A) which tie together in upright supporting bars 24 and 124. The other traverse assemblies 67, 66, 65, 64, 68, 63, 69 and 62 are similarly mounted with respect to the vertical central elements 88, 87, 89 and 86. (See FIGURE 4A.) Central element 85 has two recessed grooves 91 and 92 extending the length thereof on each face. FIGURE 7 is a top view showing in some detail these two recesses. The outer ends of 61 and 75 are rotatably affixed to 24 and 124. Elements 61 are on one side of 24, 124 and 85 while elements 75 are on the other side of 24, 124 and 85. The inner ends of the lower set of elements 61 extend upwardly and are affixed one to the other by means of thumb screw lock assembly 93 which also seats in recess 92. The inner ends of the upper set of 61 extend downwardly and are affixed one to the other by thumb lock assembly 94 which also seats in recess 92. Elements 75 on the opposite face of 24, 85 and 124 are similarly affixed by means of lock assemblies 95 and 96 which seat in recess 91. Thus, by adjusting the relative positions of the lock assemblies 93, 94, 95 and 96 in the respective recesses, the distance between elements 24 and 124 and the width of the craft is set. By tightening the screws of the respective lock assemblies the craft is made very rigid with regard to its width.

FIGURE 8 shows a preferred construction for the hand assembly 31. Upper longitudinal truck bar 25 is a channeled element supported by upright supporting bars 20 to 24. Assembly 31 has a string or wire attached to each end thereof which moves over pulleys 34 and 33 as hereinbefore described. Assembly 31 moves on rollers 200 within channel member 25. These rollers are preferably roller bearing type rollers. FIGURE 8A is a front view of the assembly.

FIGURE 9 shows an adjustable pulley housing for diversion of the pedal strings toward the respective clutch rollers. The pulley housing consists of holding frame 201, screws 203, 202 and 208. There is a notched plate 204 with three bottom plates 205, 206, 207 and four pulleys 52, 152, 53 and 153. See FIGURE 9A.) The screw 202 has a cap which fits into a groove of a holding central element 86. The rod 202 passes through the holding frame to which it is tied by screw 208 from inside of the holding frame 201. The plate 204 is notched and held in place by another screw which is located at the opposite side of the frame. This screw 203 has a notched cap which matches the notches of the plate 204. FIGURE 9A is a top view of the craft illustrating the housing in relationship to the other elements of the craft.

Details of the inflatable bottom assembly are illustrated in FIGURES 10, 10A, 10B and FIGURE 10C. Referring specifically to FIGURE 10 it is preferred that the inflatable membrane elements be compartmentalized preferably having from about 2 to 6 compartments. FIGURE 10 illustrates an assembly having four compartments having inlet conduits 210, 211, 212 and 213. FIGURE 10 shows the boat structure fully inflated showing the heavy center bar 6, the individual compartments 18 and the supporting plate elements 9. Waterproof side elements 16 and 160 are shown along with waterproof end element 269. FIGURE 10A illustrates an adaptation wherein the central compartments are inflated while the side compartments are deflated. FIGURE 10B illustrates the structure when fully inflated showing a cross-sectional view. FIGURE 10C shows the structure fully deflated for transportation.

The method of inflation may be any suitable method such as is shown by FIGURE 11. A suitable air source such as a pump 220 is used to inject air through control valve 230 having a handle 231 which controls the barrel 232 moving within the housing 233. The barrel 232 contains a conduit 234 which may be aligned between channel 235 and any individual channel 210 to 213 in order to inflate any section of the inflatable assembly.

Another desirable adaptation and feature of the present invention is the seating and backrest assembly 27 and 28 (FIGURE 2) which is designed to be positioned at any place along longitudinal bars 26 and 126. The features of the unique seating assembly is illustrated in FIGURES 12 and 12A. Referring specifically to FIGURE 12, a frame holder 240 is designed to receive longitudinal bar 26 through slot 241 and then to seat bar 26 in lock area 242. Thus, the frame can be readily positioned on longitudinal bar 26 to secure a stable and rigid attachment thereto and, at the same time, permit the frame 240 to be moved along bar 26. Suitable seat screws are utilized in order to stationarily affix frame 240 to bar 26 at the predetermined desired position. The inner side of frame 240 is characterized by having two hasps 243 which hold the cloth holder 244 in a movable manner as shown. Thus, two frames are positioned on each side of the craft in a manner to permit a cloth seat to stretch across the craft and be supported by the respective cloth holders on each side of the craft. It is obvious that the width of the cloth seat positioned about the respective holders 244 will be varied depending upon the width of the craft as inflated.

Referring specifically to FIGURES 12A and 12B, a backrest frame holder 250 is similarly slotted at 251 to permit its insertion over bar 26. Back frame holder 250 is positioned immediately behind frame holder 240. Back frame holder 250 has rotatably attached thereto a grooved pinion 253 which supports an upright strut 256. The grooves 254 on the pinion 253 match with grooves in the hole 255 in the holder 250. A hook 261 is provided with a tough but resilient string 252 which is attached to a cap 259, supported on the side of the craft. Pinion 253 is inserted into grooves 255 from the inner side of the holder 250 and cap 259 from the other side of 250. The stretched resilient string 252 holds the pinion in place. To rotate strut 256, the pinion 253 is pulled out of the notches 255 against the resistance of the stretchable string 252, rotated around the ungrooved portion of the pinion 260 and reinserted at a desirable angle. A supporting, expandible, transverse stick may be provided between the two struts 256 at about their mid level in order to keep the struts rigidly in place.

Here again, an equivalent unit is positioned on the other side of the craft and a cloth back support extends between the respective upright members 256. A further improvement is the use of a shade holder 257 between the respective elements 256. The exact position of the shade holder is determined by a screw which fastens both flattened ends of strut 256 and shade holder 257.

To disassemble the boat for transportation, the first step is to remove the large gear wheel 42 by loosening the shaft locker which is located at the bar 22, holding back the shaft 41. The released shaft 41 may be pulled out slightly from the frame so that the main gear wheel 42 will slide off the shaft. The second step is to release the thumb lock assemblies. The third is to deflate the inflatable membrane, preferably using the valve assembly as described. The cross supporting bars then collapse and both sides are squeezed closely together. The large wheels 42 and backseat support may be located in the craft at the sides. The craft is then fully collapsed and placed into a case and is ready for transportation or storage.

What is claimed is:

1. A collapsible water craft which comprises in combination, (1) an inflatable bottom, supported longitudinally by, (2) starboard and port horizontal-longitudinal bottom side bars, (3) collapsible horizontal cross bars positioned below said bottom and connecting said bottom side bars one to the other in a manner that said bottom side bars can be laterally spaced one from the other at various predetermined distances, (4) upright supporting bars positioned along said bottom side bars which extend vertically from said bottom side bars, (5) collapsible vertical cross bars connecting the upright supporting bars which are positioned along said bottom cross bars on the starboard and port side one to the other, and (6) starboard and port upper longitudinal side bars affixed to the upper ends of said upright supporting bars.

2. Craft as defined by claim 1 wherein a membrane extends around said craft to a height above the water level when said craft is afloat.

3. Craft as defined by claim 2 wherein said bottom comprises a plurality of segregated inflatable sections.

4. Craft as defined by claim 3 wherein longitudinal rigid elements are positioned between the respective inflatable segregated sections.

5. Craft as defined by claim 1 which also comprises in combination, (7) starboard and port axles supported between said upright bars and means for rotating said axles in a positive power imposing direction, and (8) means for imparting the rotational torque from said axles to a starboard and port propeller positioned at the stern of said craft.

6. Craft as defined by claim 5 wherein said starboard axle is driven by, (9) first and second starboard clutch rollers acting complementarily wherein, as one of said starboard clutch rollers is clutch engaged with said starboard axle, the other said starboard clutch roller is clutch disengaged from said starboard axle, said first and second starboard clutch roller being actuated by a, (10) right-hand mechanism, and wherein said port axle is driven by, (11) first and second port clutch rollers acting complementarily wherein, as one of said port rollers is clutch engaged with said port axle, the other said port clutch roller is clutch disengaged from said port axle, said first and second port clutch rollers being actuated by, (12) a left-hand mechanism.

7. Craft as defined by claim 6 wherein said hand mechanisms are, (13) starboard and port roller assemblies positioned in track elements in said upper longitudinal side bars.

8. Craft as defined by claim 5 wherein said starboard and said port axles are driven by, (14) third and fourth starboard clutch rollers and, (15) third and fourth port clutch rollers actuated by, (16) foot pedals wherein when one of said foot pedals is thrust forward, one of said third and fourth starboard clutch rollers will be clutch engaged and the other will be clutch disengaged on said starboard axle, and one of said third and fourth clutch rollers will be clutch engaged and one of said port clutch rollers will be clutch disengaged with said port axle.

9. Craft as defined by claim 6 wherein said means for transmitting energy from the hand mechanisms to the axles is by means of, (17) strings extending from said rollers which pass around the first of said clutch rollers and then around a pulley to the second of said clutch rollers.

10. Craft as defined by claim 4 wherein the central longitudinal rigid element is recessed in a manner to receive by means of, (18) slidable locking elements attached to the ends of said collapsible horizontal cross bars, whereby the lateral distance between said bottom side bars is adjusted.

11. Craft as defined by claim 7 wherein (19) tieing elements extend from the rear of said roller assemblies to the first of said clutch rollers, thence around the second clutch roller and thence to the forward part of said roller assemblies.

12. Craft as defined by claim 6 wherein (20) springs are attached to said clutch rollers and to spring spools under conditions that when said clutch rollers are clutch disengaged from said axle the springs will be wound up on said spring spools, thereby rotating the clutch rollers in a nonpositive direction, and when the clutch rollers are clutch engaged the springs will be unwound from said spring spools onto said clutch rollers.

References Cited

UNITED STATES PATENTS

| 2,098,606 | 11/1937 | Allen | 115—24 |
| 2,183,137 | 12/1939 | Fischer | 9—2 |

ANDREW H. FARRELL, *Primary Examiner.*